Dec. 15, 1970   D. MELNICK   3,547,658
CONVENIENTLY PACKAGED FOOD
Filed Aug. 31, 1967
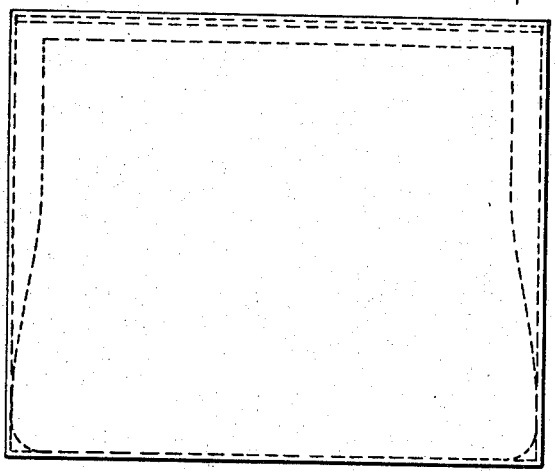
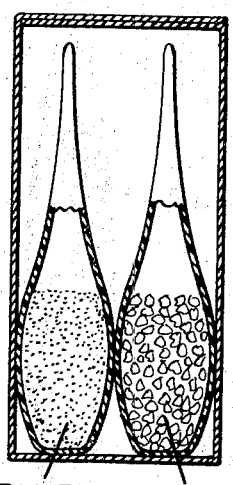
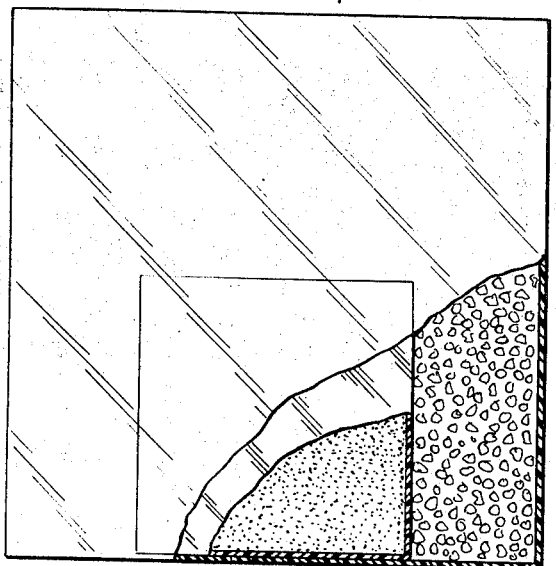
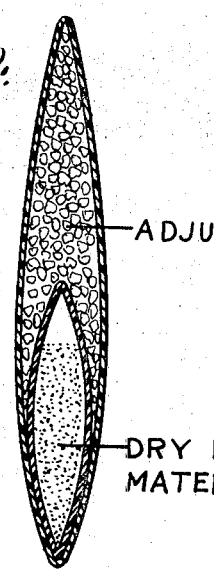
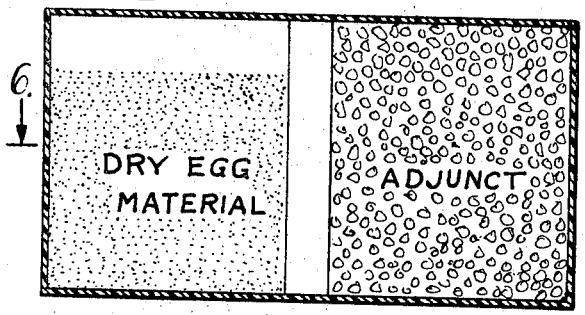
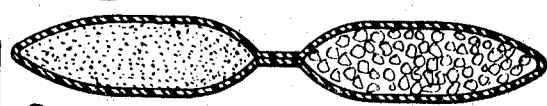
Inventor:-
Daniel Melnick,
By Martha C. Michaels Agent.

United States Patent Office 3,547,658
Patented Dec. 15, 1970

3,547,658
CONVENIENTLY PACKAGED FOOD
Daniel Melnick, Teaneck, N.J., assignor to Corn Products Company, New York, N.Y., a corporation of Delaware
Filed Aug. 31, 1967, Ser. No. 664,678
Int. Cl. A23b 5/02; B65b 25/04
U.S. Cl. 99—113
7 Claims

ABSTRACT OF THE DISCLOSURE

The present invention relates to a food product that is conveniently packaged for mixture, rehydration, and cooking, to form a consumable egg combination food product. This food product is packaged in unit or multi-unit consumption form, comprising (a), a sealed, substantially moisture-proof first package containing an easily rehydratable, dry egg material of small particulate size and (b), a sealed, substantially moisture-proof second package containing a food of gross particulate size which is in ready-to-eat form, without further hydration, and that is microbiologically and organoleptically stable.

---

The proportions in the two packages are compatible, to permit use together in preparing a final, edible product. This final product is prepared by rehydrating the egg material, mixing the two products, then cooking.

This invention relates to a conveniently packaged egg combination food product for mixture and rehydration to form a consumable egg combination food, upon cooking. More particularly, the invention relates to a conveniently packaged egg product combination in unit or multi-unit consumption form, wherein the food products are packed in two moisture-proof packages, one containing the dry, easily rehydratable egg material of small particulate size, and the other containing gross particulate food material in microbiologically and organoleptically stabilized form requiring no further hydration and hence in ready-to-eat form. The amounts in the two packages are such that they can be used together in preparing a composition ready for cooking, by rehydrating the egg material, then mixing with the contents of the other package.

Instant food products have become increasingly popular in recent years. Quick cooking products have also become popular and frequently the two terms "quick cooking" and "instant" will refer to products requiring approximately the same amount of cooking time.

Probably of all foods in the home, those of minimal convenience are the egg product combinations eaten usually at breakfast time. In the first place, time is limited at breakfast, particularly prior to the start of a working day. Secondly, the preparation, especially of the adjuncts, are laborious and time consuming. By adjuncts is meat fried bacon strips, chopped ham, chopped mixed vegetables, and the like. The lack of convenience has been responsible to a significant degree for the falling per capita consumption of eggs.

The second major reason for reduction in egg consumption is the fact that this food is one of the richest sources of dietary cholesterol. Cholesterol from egg foods is known to be readily absorbed by the digestive tract thereby contributing to increased serum cholesterol levels that are often associated with heart and circulatory diseases. In addition, egg fat possesses a low ratio of polyunsaturated to saturated fatty acids.

Thus, an egg product combination, which would permit the preparation in a matter of a few minutes of products which look like and taste like bacon and eggs, ham and eggs, a Western omelette, sausages and eggs, and the like, would be a desirable high convenience food. If these products were also nutritionally superior, in being substantially free of cholesterol and in providing fat with a ratio of polyunsaturated to saturated fatty acids of at least 1.0, then they would also satisfy the needs of many persons.

Many instant food products, including those involving egg combinations such as dehydrated ham and eggs, and dehydrated vegetables and eggs, have failed on the consumer market because the organoleptic qualities of these food combinations, after a very short or instantaneous hydration and cooking period, were unsatisfactory. These products were hardly convenience foods because of the time required to hydrate the gross food particles; nutritionally they were no better than their conventional counterparts.

It is an object of the present invention to provide a conveniently packaged egg combination food product, in unit or multi-unit consumption form.

It is another object of the present invention to provide a conveniently packaged egg combination food product, of the "instant" type, for mixture and rehydration to form a composition that can be cooked at once and eaten.

Another object of the invention is to provide a convenient package of an egg-based food product, that can be stored for months on end at room temperature without deterioration. A related object of the invention is to provide a convenient food package of the character described, that can be used to pack components that can be made up easily and quickly into a wide variety of egg dishes.

A further object of the invention is to provide a convenient package of separate containers of components of the "instant" type, that can be made up into egg-based food dishes easily and quickly, and that are in stable, storable, and easily handled form.

Yet another object of the invention is to provide convenience packages of the character described, wherein the egg-based food dishes are highly nutritious.

Still another object of the invention is to provide components of the "instant" type, that can be made up easily and quickly into highly nutritious, egg-based dishes, and that are packaged conveniently in a light-weight, flexible package that can be stored for long periods of time at ambient temperatures without deterioration, and that can be easily handled.

It is a further object of the present invention to provide a convenience package of an egg-based combination food product of the "instant" type, that can be easily and quickly made up to form a flavorful, cooked, food product, the package being moisture-proof, and the packaged components being stable against both microbiological and flavor deterioration.

Other objects and advantages of the present invention will be apparent hereinafter from the specification and from the recitals of the appended claims.

In the drawings:

FIG. 1 is a side elevation of a cardboard carton for holding pouch containers of food components packaged in accordance with one preferred embodiment of this invention;

FIG. 2 is a section taken on the line 2—2 of FIG. 1, looking in the direction of the arrows, and showing two pouches of food products within the carton;

FIG. 3 is a side elevation of a package prepared in accordance with another embodiment of the invention, showing an exterior pouch within which both the food product and a smaller pouch are included, the view being partly broken away to show the smaller pouch and its contents;

FIG. 4 is a section taken on the line 4—4 of FIG. 3, looking in the direction of the arrows;

FIG. 5 is a side elevation of a package in accordance with another embodiment of the invention, in which two separate pouches are united so as to provide a unitary package, and FIG. 6 is a section taken on the line 6—6 of FIG. 5, looking in the direction of the arrows.

The present invention provides, in a convenience package, components of the instant type that can easily be made up, by mixture and rehydration, to form a composition that can be cooked to provide a delicious egg dish. According to one preferred embodiment of this invention, the package comprises two separate pouches. These contain, respectively:

(a) an easily rehydratable, dry egg matreial of small particulate size, and (b) a food of gross particulate size in ready-to-eat form without further hydration, and that is also microbiologically and organoleptically stable.

Both pouches are made of tough, flexible, waterproof, preferably transparent plastic film, and are sealed. The amounts of their respective contacts are proportioned to form a composition that, after rehydration of the egg component, mixture, and cooking, provides an attractive egg-based dish.

The easily rehydratable dry egg material consists of particles each less than 2 millimeters and preferably less than 1 millimeter in maximum dimension.

The food of gross particulate size, which has been processed to be microbiologically and organoleptically stable, is a material such as, for example, simualted bacon crisps, vegetable salad, ham salad, sausage salad, or the like. The vegetable, ham, or sausage in their respective salads are in stabilized, hydrated, ready-to-eat form. The ham and sausage components may be meat products but preferably are meat analogs, based upon vegetable protein. In each case, the material of gross particulate size is in its maximum dimension greater than 3 millimeters, and generally greater than 5 millimeters.

The present invention may be more easily understood if these two components are discussed individually as follows.

REHYDRATABLE DRY EGG MATERIAL

The first sealed, substantially moisture-proof pouch contains dry egg material.

The egg yolk contains a major portion of the nutritional material found in the egg. In addition to protein, it ordinarily contains all of the fat and cholesterol. To prepare the preferred dry egg matreial for use in the present invention, dry egg yolk solids are solvent extracted with hexane or the like, to remove a large portion of the original fat and cholesterol (at least 50% in each case). The yolk solids are then refatted with a polyunsaturated vegetable oil, with added emulsifiers, preferably by mixing the defatted yolk solids with water, an edible vegetable oil, and one or more emulsifiers, forming this mixture into an emulsion of the oil-in-water type, pasteurizing, and spray drying. The resultant substantially dry, particulate, refatted egg yolk solids comprise an intimate mixture of yolk solids, from which a substantial portion of the original fat has been removed, and an edible vegetable seed oil that replaces at least a portion of the original fat. While dried egg yolk solids, prepared as described above constitute a preferred material for use in the present invention, conventionally dried egg yolk solids, or dried whole egg, may be used.

The advantages of using the preferred dried egg yolk solids are substantial. Preferably, such dry egg yolk solids have at least 50% of the original fat and at least 50% of the original cholesterol removed. The original fat is replaced by edible vegetable seed oil in an amount from about 10% to about 70% by weight of the refatted egg yolk solids, in such a way that, upon reconstitution by rehydration, all of the functional properties of the yolk are preserved.

The dried refatted yolk solids are intimately admixed with dried egg white solids in amounts approximating the natural proportions, that is, approximately 28.5 parts of dried egg white powder to 71.5 parts of dried refatted yolk solids.

In preparing the rehydratable material, other edible constituents, such as skim milk powder, a carbonation system, flavoring compounds and the like, may be blended with the dry egg solids. The pH of the egg material (tested after rehydration in 10% aqueous suspension) usually falls in the range between 6 and 8. The product is stable in its dehydrated form.

The dried egg product is packaged in a substantially moisture-proof pouch. The pouch is preferably made from a heat sealable film such as a polyethylene film or a polyvinylidene chloride film (saran), preferably laminated to aluminum foil. The solid egg product is in powdered form and therefore is easily divided into portions suitable for unit or multi-unit consumption form.

This dried egg product constitutes the food materials which are easily rehydratable and of small particulate size having a maximum particle size of less than 2 millimeters.

Upon mixing with water, in an amount of about 3 to 4 times as much water as egg solids on a weight basis, the egg solids rehydrate instantly, that is, within one minute. The rehydrated mixture may then be pan fried, baked, or cooked in any other desired manner, to provide an omelet, scrambled eggs, or other egg-based dish.

FOOD OF GROSS PARTICULATE SIZE

The gross particulate food is the adjunct to the egg and is usually the component of conventional egg combination dishes which is most difficult to prepare. If packaged in dehydrated form, for example, requiring hydration for organoleptic acceptability, it is the product which requires an excessive amount of time to hydrate.

The gross partculate food in the products of the present invention is a stabilized, ready-to-eat adjunct. The food, if moist, is microbiologically and organoleptically stabilized. Whether moist or dry, no further hydration is required prior to consumption.

An example of the gross particulate food in dry ready-to-eat form includes simulated fried bacon strips manufactured from vegetable materials, as described more fully hereafter. Preferred examples of the gross particulate food in moist ready-to-eat form are vegetables in moist form or in a salad dressing base; a ham analog, made predominantly from a vegetable-protein, in a moist form or in a salad dressing base; and a sausage-like product in subdivided form, made from a vegetable protein, and in an aqueous or salad dressing base. The foods of gross particulate size are preferably substantially free of cholesterol.

The food material in gross particulate form has a particle size in excess of 3 millimeters in its maximum dimension and preferably in excess of 5 millimeters in its maximum dimension.

If the gross particulate food material is in a moist form, it is stabilized against microbiological and organoleptic deterioration. Such stabilization is effected by the addition of an edible fungistat and a water-soluble metal chelating agent in an acetic acid environment. Suitable fungistats include organic free carboxylic acids and their edible alkaline metal salts. Examples of such acids are propionic, crotonic, sorbic, benzoic, and parahydroxy benzoic acid and the sodium, potassium and calcium salts thereof. Suitable water-soluble metal chelating agents include amino polycarboxylic acids such as ethylenediaminetetraacetic acid, polycarboxylic acids such as succinic acid, hydroxy polycarboxylic acids such as citric acid, polyhydroxy compounds such as inositol, and amino acids such as glutamic and aspartic acid.

It has been found that the combination of the fungistat and water-soluble metal chelating agent is exceptionally useful in preventing deterioration of a food salad product. Neither the fungistat nor the metal chelating agent alone produces as satisfactory a result. The water-soluble metal chelating agent is generally used in the food in the amount of about 0.0004% to about 2% by weight. The quantity of the fungistat present in the food varies depending upon the fungistat used, and will usually fall in the range from about 0.015% to about 0.30%. For example, fungistats of the sorbic acid and benzoic acid type are present in the food in amounts from about 0.015% to about 0.2% by weight, preferably about 0.05% to about 0.15%, whereas fungistats of the propionic acid type require somewhat higher concentrations in the foods, usually in amounts of from about 0.15% to about 0.3%.

The outstanding use of the fungistat and chelating agent in synergistic combination is in regard to food salads wherein the solid food component is for example, vegetable or meat, and the dressing is, for example, vinegar alone, mayonnaise, salad dressing, french dressing, and the like; the latter dressings are classified generically as salad dressings. It is necessary, in order for the fungistat and chelating agent to function synergistically, that the pH be below 5 and preferably below 4.5. The primary acid that is used in attaining these pH values is acetic acid. The pH values are preferably between 3.5 and 4.5. For effective synergistic combination of the fungistat, chelating agent, and acetic acid, each of these protective agents must be distributed evenly through both the solids in the solid food of gross particulate size and through the surrounding aqueous or salad dressing medium. Most desirably, the solid food component, i.e. vegetable or meat, which is combined with the dressing component, is heat processed at some stage so that it does not constitute a source of undesirable enzymic reactions or contribute undesirable microorganisms.

The presence of the fungistat, chelating agent and acetic acid permit long term storage of the packaged foodstuff, in ready-to-eat form, without need of refrigeration, although in some cases the latter is desirable.

The final, reconstituted, mixed, and cooked egg-combination food product ordinarily has a pH above 6, usually, between 6.5 and 8.5, tested as a 40% aqueous suspension. The low pH of the food of gross particulate size does not adversely affect the flavor or pH of this final product.

The ready-to-eat food of gross particulate size is packed in its pouch in an amount in the range from 0.25 to 2.0 parts by weight for each part by weight of the easily rehydratable dry egg material. Generally, the gross particulate food supplement is packed in an amount in the range from 0.4 to 1.2 parts by weight for each part by weight of the dry egg material.

The preferred reconstituted, mixed, and cooked egg-combination food products are substantially free of cholesterol. That is, they contain less than 20%, and more usually less than 10%, of the cholesterol quantity found in the usual serving of the egg product combination made with conventional components. Moreover, the fat component has a ratio of polyunsaturated to saturated fatty acids of at least 1.0.

The invention will be further illustrated by several detailed examples. All parts and percentages are by weight unless expressly stated to be otherwise.

EXAMPLE 1

Spanish style omelet

*The rehydratable dry egg material.*—Water, defatted egg yolk solids, corn oil, emulsifying agents and salt were combined in the proportions set forth below. The mixture was emulsified and then flash pasteurized and spray dried. The resulting product was dispersible in water and exhibited characteristics of natural dried egg yolk solids but was exceptionally and desirably bland in flavor.

| Ingredients: | Percent by wt. |
|---|---|
| Water | 67.0 |
| Defatted low cholesterol yolk solids | 14.7 |
| Phosphated monoglyceride | 0.3 |
| Salt | 1.1 |
| Corn oil containing added carotene | 16.4 |
| Glyceryl mono-oleate | 0.3 |
| Polyoxyethylene (20) sorbitan monostearate | 0.2 |

The dried, refatted egg yolk solids were blended with dried egg white and non-fat milk solids in the ratio of 24.2 parts of the egg white solids to 65.0 parts of the egg yolk solids to 7.2 parts of the non-fat milk solids. Supplementary materials including a carbonation (baking powder) system, gum, and flavorings were added in small amounts totaling 3.6 parts. The pH of the dry egg material (tested after rehydration) was 7.3. This rehydratable dry egg material, of particulate size of less than 2 millimeters, was packaged in unit consumption form, in heat sealable pouches made from a laminated material of saran film, aluminum foil, and kraft paper. The polyvinylidene chloride (saran) film was on the interior of the pouches, in contact with the dry egg solids product. The foil is an insulator and shields against moisture and air permeation, and the kraft paper permits printing on the exterior.

Each pouch was sealed and these components of the food convenience package were then ready to be packed in cartons, each one with one of the other sealed pouches containing the gross particulate food material.

*The food of gross particulate size.*—This was a vegetable salad prepared as follows:

| Dressing component: | Parts by wt. |
|---|---|
| Mayonnaise | 43.81 |
| Sugar | 3.55 |
| Vinegar (100 gr. spirit) | 1.89 |
| Salt | 1.20 |
| Gum tragacanth | 0.21 |
| Salad oil | 0.24 |
| Sorbic acid | 0.025 |
| Ethylenediaminetetraacetic acid as its calcium disodium salt | 0.003 |
| Total | 50.928 |

| Dehydradated vegetable component (rehydrated basis): | Parts by wt. |
|---|---|
| White and French chopped onion | 16.47 |
| Green sweet pepper | 8.19 |
| Carrot | 8.15 |
| Pimiento | 8.15 |
| Sweet relish | 8.112 |
| Total | 49.072 |
| Grant total | 100.00 |

| Reconstitution liquor for the chopped, dehydrated vegetables: | Parts by wt. |
|---|---|
| Water | 93.77 |
| Vinegar (100 gr. spirit) | 4.02 |
| Salt | 2.00 |
| Sorbic acid | 0.20 |
| Ethylenediaminetetraacetic acid as its calcium disodium salt | 0.01 |
| Total | 100.00 |

The dehydrate chopped vegetables were reconstituted in 6.5 parts of the above described reconstitution liquor per 1 part of vegetables at 45° F. for 20 hours. The vegetables were drained of excess liquor after the reconstitution period. These hydrated vegetable pieces were all in excess of 3 millimeters and most of them were well in excess of 5 millimeters in maximum dimension.

The drained vegetables and the dressing component were blended and filled into heat sealable pouches of the same construction as those in which the dry egg product was packaged. Two pouches of each kind were then placed in a carton, for sale as a food convenience package as in FIGS. 1 and 2. The net weights of the two pouches were the same.

For use, the egg product is removed from its pouch and is combined with 3 to 4 parts by weight of water by blending with a fork or with an electrical blending device, or the like. The contents of the second envelope are added to the mixture, just before or during the blending operation. The combined vegetable-egg batter is poured on a greased frying pan and the product is then cooked in omelet or scrambled egg style. The pH of the cooked product is about 6.8. From the time of opening the pouches to the serving of the Spanish style omelet, a period of only a few minutes is required.

Both the dry egg component and the moist salad component in their respective pouches are stable against microbiological and flavor deterioration, at ambient temperatures, for periods in excess of 12 weeks.

EXAMPLE 2

Egg and bacon-like product

Portions of the dry egg product of Example 1, of unit consumption size, were packaged in a substantially moisture-proof pouch of small size. Simulated bacon strips, to be described presently, were packed in a second, larger, moistureproof pouch. The first pouch was sealed and placed in the second pouch and the latter was then sealed (see FIGS. 3 and 4). The simulated bacon strips were packed in the amount of 0.4 part by weight for each part by weight of egg material in the first pouch.

The bacon strips were prepared from a dough that was made from the following ingredients:

| Ingredient: | Percent by wt. |
| --- | --- |
| All purpose cake flour | 34.85 |
| Vital wheat gluten | 8.59 |
| Pulverized H-O Quick Oats (Best Foods Div., Corn Products Co.) | 12.18 |
| Salt | 8.02 |
| Hydrolyzed plant protein | 4.24 |
| Hydrogenated cottonseed oil (102° F., M.P.; 63 I.V.) | 14.90 |
| Flavor | 3.44 |
| Water | 13.75 |
| Coloring (F.D. & C. Certified) | 0.03 |

The flavor material was an imitation bacon flavor that was purchased from a commercial producer.

The dough was prepared from these ingredients in the following manner. All of the dry ingredients, except the food coloring, were mixed together in a planetary mixer. The shortening was then melted and added to the other ingredients. Blending was continued for a few minutes to obtain a crumbly mass with fairly uniform distribution of the shortening.

The coloring and water were then added to the mixer, and blended with the other ingredients, to produce a dough sufficiently moist to form a dough ball. A second batch of dough was then prepared in the same manner, but the coloring was omitted. These two dough formulations, identical to each other in physical characteristics, differing only in color, were fed in alternating fashion into a food press equipped with a die plate (Mafalde type) designed to produce ribbons of dough about 1.6 cm. wide and 1 mm. thick with rippled edges on both sides. The ribbons of raw dough were cut into strips at lengths of about 1–3 cm.

These strips were baked for about 10 minutes at about 325° F. and then were impregnated with a vegetable oil blend (M.P. of 110° F.) of hydrogenated coconut oil and hydrogenated soybean oil to which an oil-soluble smoke flavor was added. The analysis of the strips was found to be approximately 28% fat, 12% salt, and less than 1% water, by weight.

These strips had the appearance of strips of fried bacon. They were crisp, had curls and ripples, and showed distinct reddish-brown and light tan bands running parallel to the length of the strip. The physical appearance of these duo-colored chips strongly resembled fried bacon containing both lean and fatty portions. Their taste and texture were also excellent.

The pH of the product (tested in 10% aqueous suspension) was 5.8.

The simulated bacon crisps were added to the omelet after cooking but they may be added at any time during frying of the egg material. It is preferable to add them during the latter stages of cooking or after cooking is completed. The pH of the end product combination was 7.8.

The final product was superior in many ways to what is possible with conventional products. In the first place, both egg and bacon analog were substantially free of cholesterol and the fat content possessed a ratio of polyunsaturated to saturated fatty acids in excess of 1.0. Secondly, the egg and bacon-analog product are stable against microbiological and flavor deterioration at room temperature for periods in excess of 20 weeks. Thirdly, from the time of opening the pouches to the serving of the egg and bacon-like product, a period of only a few minutes was required. These three aspects of unusual nutritional values, excellent stability and great convenience cannot be matched by present day eggs and bacon in any of its forms and combinations.

EXAMPLE 3

Egg and ham-like product

The dry egg material was packaged in a first pouch of a substantially moisture-proof dual pouch package having a sealed strip uniting two separate pouches, as shown in FIGS. 5 and 6. A measured amount of a simulated ham component, to be described presently, was packed in the second pouch.

The ham analog used in this example was made from soy protein fibers, cross-linked with egg albumen, the latter containing coloring and flavoring to simulate ham. It was in the form of small diced pieces of about ½ centimeter diameter, freeze-dried. However, it could be used in either moist or freeze-dried form.

When the ham analog is not dehydrated, it is made with the protective solution previously described, so that the protective agents are uniformly distributed throughout this product.

To make the ham analog component, 17.2 parts by weight of the freeze-dried pieces were combined with 13 parts by weight of chopped pickle relish. The pickle relish provided the acetic acid. This combination was placed in 51.6 parts of a reconstitution liquor containing water, 99.766%; sorbic acid, 0.200%; and ethylenediaminetetraacetic acid, 0.034%. The ham analog and pickle relish remained in the reconstitution liquor at a temperature of 70° F. for two hours, after which the excess liquid was drained off and discarded. The blend after reconstitution was as follows:

| Component: | Parts by wt. |
| --- | --- |
| Ham analog | 43.0 |
| Relish | 13.0 |

The pH of the above components (tested as a 40% aqueous suspension) was 4.4. The gross particulate material of ham-like chunks in hydrated ready-to-eat form and the pickle relish were packaged in the second moisture-proof sealed pouch or envelope in the amount of 0.5 part by weight for each part of egg material in the adjoining pouch. The two pouches, one attached to the other, were then placed in an exterior carton package for sale as a single convenience food package, in unit consumption size portions.

To use, the consumer removes the egg material from its pouch and adds it to 3 to 4 parts by weight of water. The contents of the second pouch are then added and the total mixture is well stirred and blended for about one minute. The material is then pan-fried with or without scrambling. The pH of the end product was 7.3. It had exceptionally good flavor and texture qualities. From the time of opening the pouches to the serving of the egg and ham-like product, a period of only a few minutes was required.

The packaged products were stable against microbiological and flavor deterioration for many weeks at room temperature, and for more than 16 weeks under usual temperatures of refrigeration (about 40° to 45° F.). Here also the combination of unusual nutritional value, good organoleptic qualities, stability, and high convenience cannot be matched by present day ham and eggs in any of its forms and combinations.

EXAMPLE 4

Ham-flavored salad omelet

The mixture of the reconstituted ham analog and pickle relish of Example 3 was combined with a modified mayonnaise dressing, as described below. This combination was packed in a moisture-proof sealed envelope, which was then placed in a cardboard carton with a second envelope containing the same dry egg product that was used in Example 1.

The modified mayonnaise dressing, to which the ham analog and pickle relish mixture was added, was made up as follows.

| Component: | Parts by wt. |
| --- | --- |
| Mayonnaise | 41.509 |
| Artificial flavoring | 2.010 |
| Carboxymethyl cellulose | 0.070 |
| Salad oil | 0.140 |
| Sorbic acid | 0.098 |
| Ethylenediaminetetraacetic acid as its calcium disodium salt | 0.089 |
| Artificial color | 0.084 |
| Total | 44.000 |

The 44 parts of mayonnaise dressing were blended with 56 parts of the mixture of rehydrated ham analog and pickle relish of Example 3. The pH of the resulting salad, tested as a 40% aqueous suspension, was 4.4.

The two envelopes provided the same net weights of packaged food materials. The two packages were then placed in cardboard carton for sale as a convenience food package.

A pan-fried egg combination food was prepared according to the method described for Example 3. The pH of the end product was 7.1. It had excellent organoleptic qualities. This product also was prepared in a matter of a few minutes.

General

The packaged food products of the present invention may be packed in a family size package containing enough of both components for the preparation of three to four individual servings. This size package would require a pouch of the egg material containing about 57 grams and a second pouch of the adjunct component in an appropriate amount. Alternately, the convenience package may comprise a carton containing a multiplicity of individual small sealed pouches, each containing enough of one material for a single serving. The dry egg material in each such pouch would usually be about 19 grams, with the accompanying ready-to-eat adjunct material being packed in separate pouches in appropriate amounts, as specified earlier. The individual servings in the one carton may all be of the same egg-combination product or they may differ within a given carton.

I claim:

1. A conveniently packaged egg combination food product in unit or multi-unit consumption form for mixture and rehydration to form a consumable egg product upon cooking, comprising:
   (a) an easily rehydratable, dry egg material comprising egg yolk solids from which a substantial portion of the original fat and cholesterol have been removed, and an edible vegetable seed oil replacing at least a portion of the removed fat, said egg material being packed in a first moisture-proof sealed package, and
   (b) a moist ready-to-eat foodstuff of gross particulate size in microbiologically and organoleptically stabilized form, requiring no further hydration, packed in a second moisture-proof sealed package,
   the proportions in each of said packages being compatible to permit their use together in preparing a composition, ready for cooking, by rehydrating the egg material and mixing the egg material with the food of gross particulate size, either before or after cooking of the rehydrated egg material, and
   (c) said packages being disposed together in such manner as to provide a unit package of both.

2. A conveniently packaged food product in accordance with claim 1, wherein the vegetable seed oil is characterized by a ratio of polyunsaturates to saturates that is greater than 1.0.

3. A conveniently packaged food product as in claim 1 wherein the moist ready-to-eat foodstuff is contained in an acetic acid environment in the presence of from about 0.015% to about 0.3% of an edible fungistat and about 0.0004% to about 2% of an edible water-soluble metal chelating agent, said fungistat, chelating agent and acetic acid being evenly distributed throughout the moist ready-to-eat foodstuff, and said foodstuff having a pH less than about 5.

4. A conveniently packaged food product in accordance with claim 1, wherein at least about 50% of the original fat and at least about 50% of the original cholesterol in the egg yolk solids have been extracted and an edible vegetable seed oil in an amount from about 10% to about 70% by weight of the refatted egg material has been added to refat the egg yolk solids.

5. A conveniently packaged food product in accordance with claim 1, wherein the dry egg material and the moist ready-to-eat foodstuff provide in combination following rehydration, mixing and cooking, a cooked product which is substantially free of cholesterol and wherein the fat component has a ratio of polyunsaturated to saturated fatty acids of at least about 1.0.

6. A conveniently packaged food product in accordance with claim 1, wherein the pH of the combination of the rehydratable egg solids and the moist ready-to-eat foodstuff as measured in 40% aqueous suspension is from about 6.0 to about 8.5.

7. A conveniently packaged egg combination food product in unit or multi-unit consumption form for mixture and rehydration to form a consumable egg product upon cooking, comprising:
   (a) an easily rehydratable, dry egg material comprising egg white solids and egg yolk solids, the egg yolk solids having been treated to remove at least about 50% of the fat and at least about 50% of the cholesterol and refatted with a vegetable seed oil in an amount from about 10% to about 70% by weight of the refatted egg yolk solids, the dry egg material being packed in a first moisture-proof sealed package, and
   (b) a moist ready-to-eat foodstuff of gross particulate size contained in an acetic acid environment in the presence of from about 0.015% to about 0.3% of an edible fungistat and from about 0.0004% to about 2% of an edible water-soluble metal chelating agent, said fungistat, chelating agent and acetic acid being evenly distributed throughout the moist ready-to-eat foodstuff, the foodstuff having a pH less than about 5, and the moist ready-to-eat foodstuff being packed in a second moisture-proof package,
the proportions in each of said packages being compatible to permit their use together in preparing a composition, ready for cooking by rehydrating the egg material and mixing the egg material with the moist ready-to-eat foodstuff, either before or after cooking of the rehydrated egg material, to obtain an egg product which is substantially free of cholesterol and the fat component has a ratio of polyunsaturated to saturated fatty acids of at least about 1.0, and (c) said packages being disposed together in such a manner as to provide a unit package of both.

References Cited
UNITED STATES PATENTS

| | | | |
|---|---|---|---|
| 2,236,641 | 4/1941 | Karmen | 99—171 |
| 2,357,585 | 9/1944 | Galvin et al. | 99—171 |
| 2,798,813 | 7/1957 | Patterson | 99—171X |
| 2,838,403 | 6/1958 | Notter | 99—177X |
| 3,008,835 | 11/1961 | Madding | 99—171(CPD) |
| 3,136,641 | 6/1964 | Koesterer et al. | 99—210X |
| 3,144,931 | 8/1964 | Long | 99—210 |
| 3,162,540 | 12/1964 | Kline et al. | 99—210 |
| 3,201,261 | 8/1965 | Carey et al. | 99—210 |
| 3,222,194 | 12/1965 | Gorman et al. | 99—210 |
| 3,251,697 | 5/1966 | Lineweaver et al. | 99—210 |
| 3,260,606 | 7/1966 | Azuma | 99—210X |
| 3,285,749 | 11/1966 | Shires | 99—177X |
| 3,294,227 | 12/1966 | Schneider et al. | 99—171(CPD) |

FOREIGN PATENTS

| | | | |
|---|---|---|---|
| 1,059,861 | 2/1967 | Great Britain | 99—171 |

OTHER REFERENCES

"Bacon . . . Booklet," Modern Packaging, November 1959, pp. 145, 99–171.

Clarke, "Dried Eggs . . . Rations," Eggs & Poultry mag., 5-43, pp. 195–197, 237, 238.

Spector, Handbook of Biological Data, Saunders & Co., copyrighted 1956, pp. 231, 234.

Lawler, "Food Engineering," May 1966, pp. 52–56 and 68, 99–171.

Haaht: et al., "Continuous Solvent Gradient Extraction of Lipids . . . ," Acta Chemica Scandinavica, 21(10), 1967, pp. 2773–2780.

TIM R. MILES, Primary Examiner

U.S. Cl. X.R.
99—210, 177, 171